United States Patent [19]

Mitsuta et al.

[11] Patent Number: 4,831,546
[45] Date of Patent: May 16, 1989

[54] METHOD AND APPARATUS FOR ASSISTING LAYOUT DESIGN

[75] Inventors: Toru Mitsuta; Yutaka Wada, both of Hitachi; Yasuhiro Kobayashi, Katsuta, all of Japan

[73] Assignee: Hitachi, Ltd., Tokyo, Japan

[21] Appl. No.: 50,314

[22] Filed: May 15, 1987

[30] Foreign Application Priority Data

May 16, 1986 [JP] Japan .................................. 61-110797

[51] Int. Cl.⁴ .......................................... G06F 15/606
[52] U.S. Cl. .................................. 364/512; 364/518; 364/550; 340/720
[58] Field of Search ............... 364/512, 488, 491, 505, 364/518, 521, 550; 340/720, 723

[56] References Cited

U.S. PATENT DOCUMENTS 4,651,284  3/1987  Watanabe et al. .................. 364/491
4,700,317  10/1987 Watanabe et al. .................. 364/512

FOREIGN PATENT DOCUMENTS 0088503  9/1983  European Pat. Off. ............ 364/512
59-163665 9/1984 Japan .................................. 364/512

Primary Examiner—Parshotam S. Lall
Assistant Examiner—Brian M. Mattson
Attorney, Agent, or Firm—Antonelli, Terry & Wands

[57] ABSTRACT

A layout design assisting system operates in the following steps. A drawing of a layout area for installing a plurality of layout objects is displayed on a display unit. The operator specifies one of the displayed layout objects. Another layout object which interferes with the specified layout object is found in the layout area. An economical loss imposed on the specified layout object attributable to the other layout object is evaluated. Examination is conducted as to whether or not the other layout object can be relocated so that it does not interfere with the specified layout object. The specified layout object, the other layout object, the economical loss and the examination result are displayed on the display unit.

11 Claims, 19 Drawing Sheets

FIG. 2(A)

| NAME | TYPE | DIAMETER | START POINT | END POINT | BEND POINTS |
|---|---|---|---|---|---|
| R1 | PIPING | 400 | S | G | P1, P2, P3, P4 |

| S | | | G | | |
|---|---|---|---|---|---|
| x | y | z | x | y | z |
| 7500 | 1600 | 1500 | 1700 | 6000 | 1500 |

| P1 | | | P2 | | |
|---|---|---|---|---|---|
| x | y | z | x | y | z |
| 7500 | 5000 | 1500 | 4500 | 5000 | 1500 |

| P3 | | | P4 | | |
|---|---|---|---|---|---|
| x | y | z | x | y | z |
| 4500 | 3500 | 1500 | 2500 | 3500 | 1500 |

FIG. 2(B)

| NAME | TYPE | CENTRAL POSITION | | | DIMENSIONS | | |
|---|---|---|---|---|---|---|---|
| | | x | y | z | $\Delta x$ | $\Delta y$ | $\Delta z$ |
| C1 | EQUIPMENT | 3500 | 1500 | 1000 | 400 | 1800 | 2000 |

FIG. 9

| NAME | AFFECTING OBJECT | AFFECTING PIPING ROUTE SECTION | OPTIMAL PARTIAL PIPING ROUTE |
|------|------------------|-------------------------------|------------------------------|
| R1   | C1               | P2-P3-P4-P5                   | P2-P5                        |

| P2 | | | P3 | | |
|---|---|---|---|---|---|
| x | y | z | x | y | z |
| 4500 | 5000 | 1500 | 4500 | 3500 | 1500 |

| P4 | | | P5 | | |
|---|---|---|---|---|---|
| x | y | z | x | y | z |
| 2500 | 3500 | 1500 | 2500 | 5000 | 1500 |

| OBJECT TO BE RELOCATED | NEW ROUTE | P1 | | | P2 | | | P5 | | |
|---|---|---|---|---|---|---|---|---|---|---|
| | | x | y | z | x | y | z | x | y | z |
| R1 | P1-P2-P5-P6 | 7500 | 5000 | 1500 | 4500 | 5000 | 1500 | 2500 | 5000 | 1500 |

(B)

| RELOCATED OBJECT NAME | CAUSING OBJECT NAME | CLASS | NEW CENTRAL POSITION | | |
|---|---|---|---|---|---|
| | | | x | y | z |
| C1 | R1 | 2 | 3500 | 6500 | 1000 |

(C)

| RELOCATED OBJECT NAME | CAUSING OBJECT NAME | CLASS | CLASS | NEW CENTRAL POSITION | | | FLAG |
|---|---|---|---|---|---|---|---|
| | | | | x | y | z | |
| C2 | C1 | 2 | 1 | 4400 | 8400 | 2000 | 0 |

| LAYOUT PLAN NUMBER | RELO-CATED PIPE | RELO-CATED UNITS | CHANGE IN TOTAL ROUTE LENGTH | CHANGE IN TOTAL MATERIAL | |
|---|---|---|---|---|---|
| 1 | R1<br>R5 | C3<br>C8<br>C7 | −3% | −2.3% | |
| 2 | R1<br>R3 | C3<br>C10<br>C27 | −4.2% | −3.9% | |
| | | | | | |

FIG. 14

| LAYOUT PLAN CLASS NUMBER | DECISION FLAG | NON-RELOCATABLE OBJECT | RELOCATED OBJECTS |
|---|---|---|---|
| 2 | 0 | C3, C4 | R1, C1, C2, |

| OBJECT NAME | NEW ROUTE |
|---|---|
| R1 | P1-P2-P5-P6 |

| P1 | | | P2 | | |
|---|---|---|---|---|---|
| x | y | z | x | y | z |
| 7500 | 5000 | 1500 | 4500 | 5000 | 1500 |

| P5 | | | P6 | | |
|---|---|---|---|---|---|
| x | y | z | x | y | z |
| 2500 | 5000 | 1500 | 2500 | 5500 | 1500 |

| OBJECT NAME | NEW CENTRAL POSITION | | |
|---|---|---|---|
| | x | y | z |
| C1 | 3500 | 6500 | 1000 |

| OBJECT NAME | NEW CENTRAL POSITION | | |
|---|---|---|---|
| | x | y | z |
| C2 | 4400 | 8400 | 2000 |

4,831,546

METHOD AND APPARATUS FOR ASSISTING LAYOUT DESIGN

BACKGROUND OF THE INVENTION

This invention relates to a method and apparatus for assisting layout design, and particularly to a method and apparatus for assisting layout design suitable for modifying the layout of objects during the layout design process.

For the layout planning of plant installations (equipment and piping), there has been developed a method of automatically determining the optimal piping route by entering data of installation layout and data of design reference, as disclosed in Japanese Patent Kokai JP-A-No. 60-79470. This method, however, does not include the determination of layout for equipment and does not have the ability of modifying the equipment layout plan and existing pipe route for reducing the total pipe length.

A method of assisting layout modification is described in Japanese Patent Kokai JP-A-No. 58-114264. This method is pertinent to the design of printed wiring boards and the layout of IC modules on a printed wiring board, in which a flag indicative of the design procedure is appended to each circuit component and when a circuit component is intended to relocate, the layout plan portion which has been made latter than the circuit component is deleted automatically. The method, however, solely follows the order of component placement, and therefore it does not allow the layout alteration for a high-order layout component in connection with the layout alteration of a low-order layout component.

A hierarchical layout method is proposed in the gazette of Information Processing Society of Japan, Vol. 25, No. 10, 1984, pp. 1080–1081. This method implements first the block layout, next the cell layout within each block, and finally the wiring among cells. The method allows the layout modification within each stage of layout design, however, it is not possible to alter a high-order block layout in order to modify a low-order wiring.

Some of the above-mentioned prior art systems include a layout modification ability, however, they do not reveal which object should be relocated to achieve economical layout.

SUMMARY OF THE INVENTION

A primary object of this invention is to provide a method and apparatus for assisting layout design which readily pinpoint a layout object that hampers economical overall layout.

A secondary object of this invention is to provide a method and apparatus for assisting layout design which reveals a portion of layout alteration that induces a further drastic economical improvement.

A tertiary object of this invention is to provide a method and apparatus for assisting layout design which reveal the feasibility of layout modification of a portion that hampers economical layout.

The above first object is achieved through the processing steps of retrieving data of a layout object from a first memory in response to the designation of the object through an input unit, retrieving design reference data pertinent to the specified layout object from a second memory, finding another layout object, which is placed in interference with the specified layout object, based on the retrieved layout object data and design reference data, and displaying the specified layout object and the other layout object on a display unit.

The above second object is achieved through the processing steps of retrieving data of a layout object from a first memory in response to the designation of the object through an input unit, retrieving design reference data pertinent to the specified layout object from a second memory, finding other layout object, which is placed in interference with the specified layout object, based on the retrieved layout object data and design reference data, evaluating the economical loss imposed on one of the specified layout object and the other layout object due to the influence of another, and displaying the specified layout object, the other layout object and the value of economical loss on a display unit.

The above third object is achieved through the processing steps of retrieving data of a layout object from a first memory in response to the designation of the object through an input unit, retrieving design reference data pertinent to the specified layout object from a second memory, finding another layout object, which is placed in interference with the specified layout object, based on the retrieved layout object data and design reference data, examining the feasibility of layout modification which relocates one of the specified layout objects and the other layout object, and displaying the specified layout object, the other layout object and the examination result of layout modification on a display unit.

BRIEF DESCRIPTION OF THE DRAWINGS

FIGS. 2A–2B are diagrams used to explain the layout object data which are stored in the layout object data memory;

FIG. 9 is a diagram used to explain the stored data of other layout object which affects the specified layout object and of affected portions of the specified layout object, at the end of step 11;

FIGS. 12(A)–12(C) are a set of diagrams showing the data stored in steps 15D and 15E;

FIG. 14 is a diagram showing the data processed in step 15F in FIG. 11;

DESCRIPTION OF THE PREFERRED EMBODIMENTS

Specific embodiments of the present invention will be described in the following.

Figure 1:
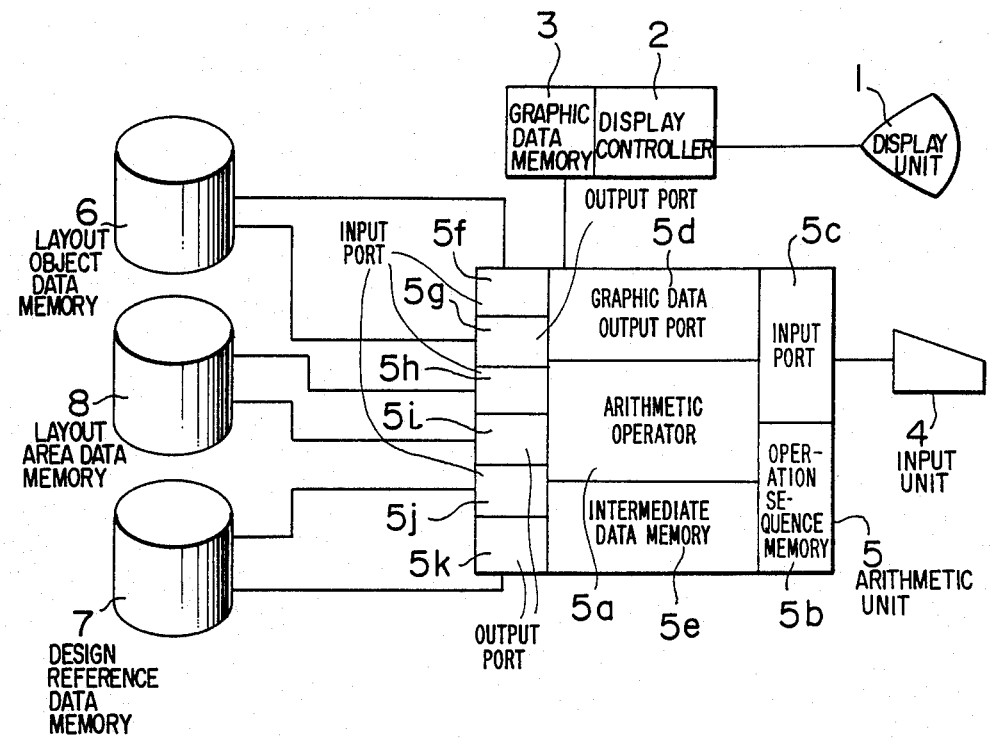
FIG. 1 is a block diagram of the layout design assisting system embodying the present invention.

In FIG. 1 showing an embodiment of this invention, the layout design assisting system includes a display unit 1, a graphic display controller 2, a graphic data memory 3, an input unit (e.g., keyboard) 4, an arithmetic processing unit 5, a layout object data memory 6, a design reference data memory 7, and a layout area graphic data memory 8. The arithmetic processing unit 5 consists of an arithmetic operator 5a, an operation sequence memory 5b, an input port 5c, a graphic data output port 5d, an intermediate data memory 5e, a layout object data input port 5f, a layout object data search signal output port 5g, a design object graphic data input port 5h, a design object graphic data search signal output port 5i, a design reference data input port 5j, and a design reference data search signal output port 5k. Graphic data to be displayed is produced in the arithmetic processing unit 5 and stored in the graphic data memory 3.

Figure 20:
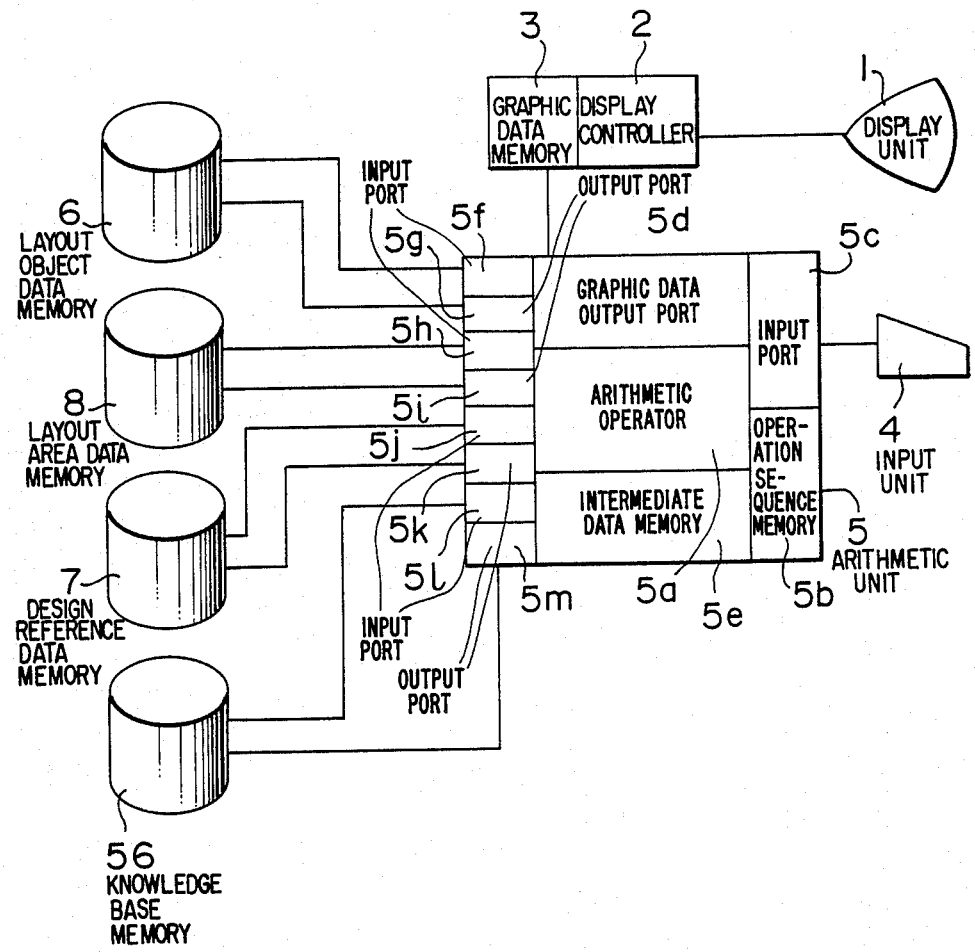
FIG. 20 is a block diagram showing another embodiment of the inventive layout design assisting system.

The graphic display controller 2 retrieves graphic data from the graphic data memory 3 and displays it on the display unit 1. The layout object data memory 6 stores data related to layout objects (piping and equipment). FIG. 2 shows an example of the stored layout object data, and it includes data of a pipe R1 and a unit C1. Layout object data for piping includes the pipe diameter and coordinates (x, y, z) of the start point, end point and bend points along each pipe route, while data for equipment includes coordinates of the central position and dimensions of each unit. The design reference data memory 7 stores design reference data which prescribes the rule of layout (e.g., spacing between a unit and a pipe). The design reference data is described in Japanese Patent Application No. 60-53764 (corresponding to U.S. Pat. No. 4,789,944 and EPC patent application No. 86103203.5). The layout area graphic data memory 8 stores such graphic data as shown in FIG. 20 of Japanese Patent Application No. 60-53764 (corresponding to FIG. 18 of U.S. Pat. No. 4,789,944 and EPC patent application No. 86103203.5) and FIG. 23 of Japanese Patent Application No. 60-253767 (corresponding to FIG. 24 of United States patent application Ser. No. 929,894 and EPC patent application No. 86115709.7).

Figure 3:
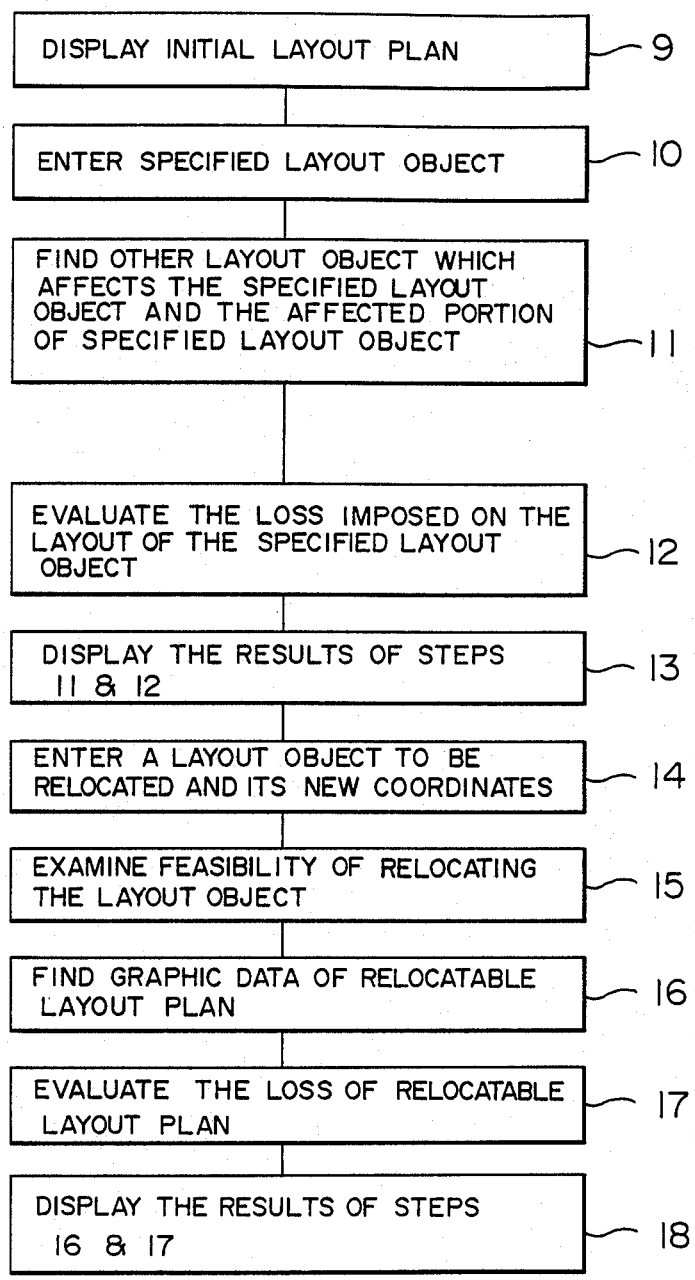
FIG. 3 is a flowchart explaining the operational sequence of the layout design assisting system shown in FIG. 1.

FIG. 3 shows the sequence of operation implemented by the arithmetic processing unit 5. The operation of the inventive layout design assistance system shown in FIG. 1 will be described in the following.

Step 9 is to display an initial layout plan, step 10 is to enter data of a specified layout object, step 11 is to find another layout object which affects the layout of the specified layout object and find portions of the specified layout object under the influence of the other layout object, step 12 is to evaluate the value of loss attributable to the layout of the specified layout object, step 13 is to display the other layout object affecting the layout, the portion of the specified layout object under influence of the other layout object, and the value of loss, step 14 is to enter a layout object to be relocated and its new coordinates, step 15 is to examine whether the modified layout plan entered in step 14 is feasible by the relocation of the other layout object, step 16 is to produce graphic data for the modified layout plan, step 17 is to evaluate the value of loss pertinent to the modified layout plan, and step 18 is to display the examination result of step 15, the graphic data produced in step 16, and the value of loss evaluated in step 17.

The details of the processing steps shown in FIG. 3 are as follows. After a layout object has been laid out in steps 11 through 24 of the design assisting method which is shown as an embodiment in FIG. 7 of U.S. Pat. No. 4,789,944 and EPC patent application No. 86103203.5 (Japanese Patent Application No. 60-53764), or step 9 through 14 of the design assisting system which is shown as an embodiment in FIG. 9 of United States patent application Ser. No. 929,894 and EPC patent application No. 86115709.7 (Japanese Patent Application No. 60-253767) (Note: the layout object is termed "design object" in the preceding patent applications), graphic data of the layout object (e.g., piping) is stored in the layout area graphic data memory 8 together with graphic data of a unit which is the other layout object located in the area where the layout object is placed and constructions (e.g., walls and pillars of a building) in the layout area. The graphic data stored is, for example, as shown in FIG. 24 of United States patent application Ser. No. 929,894 and EPC patent application No. 86115709.7. The graphic data shown in FIG. 24 of the preceding patent applications is of the layout of one floor of a building for accommodating a nuclear reactor, and a single layout area is used to deal with one floor. If a floor is too large, it may be split into a plurality of layout areas, with graphic data of each small layout area being stored in the memory.

The recent industry pursues the economy of layout for piping and equipment, and the operator of the design assisting system is requested to make an economical layout for the layout objects (pipes 600A-LPCS-3, 100A-LPCS-37 and 65A-LPCS-45, and other installations) shown in FIG. 24 of the preceding United States patent application Ser. No. 929894 and EPC patent application No. 86115709.7. The layout plan described in the U.S. Pat. No. 4,789,944, pp. 6–43 (EPC patent application No. 86103203.5. pp. 5–42), or United States patent application Ser. No. 929894, pp. 6–23 (EPC patent application No. 86115709.7, pp. 5–22) is an initial layout plan for which economy is yet taken into account.

In carrying out the economical layout design, the operator first specifies an intended layout area through the input unit 4. In response to the designation of a layout area, the process sequence shown in FIG. 3 is transferred from the process sequence memory 5b to the arithmetic operator 5a, which then implements the process in accordance with the process sequence.

Figure 4:
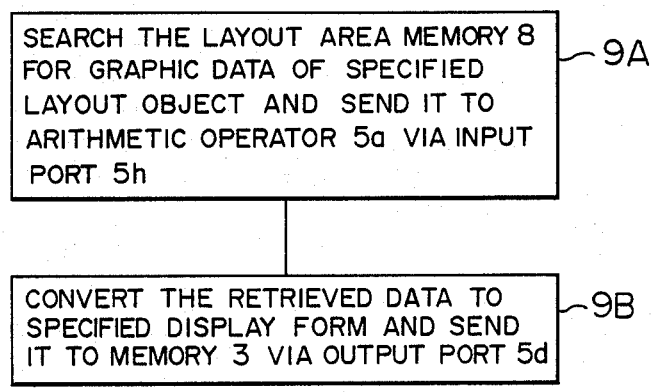
FIG. 4 is a flowchart showing in detail the operational step 9 in FIG. 3.

In the beginning, the initial layout plan is displayed: (step 9). FIG. 4 shows the details of step 9. In step 9A, graphic data pertinent to the specified layout area is retrieved from the the layout area graphic data memory 8, and it is entered by way of the input port 5h into the arithmetic operator 5a. The arithmetic operator 5a transforms the entered graphic data to a display form (third angle projection or isometric projection) specified by the operator through the input unit 4, and sends the transformed graphic data by way of the graphic data output port 5d to the graphic data memory 3: (step 9B). The transformation of the graphic data takes place in the same manner as the steps shown in FIGS. 12A and 12B of U.S. Pat. No. 4,789,944 and EPC patent application No. 86103203.5.

Figure 5:
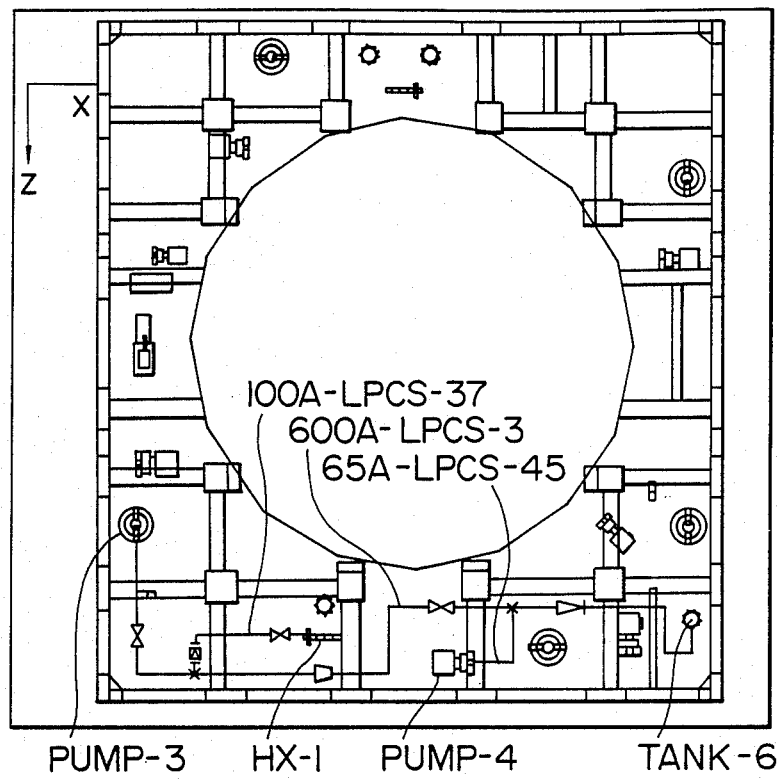
FIG. 5 is a diagram showing an example of display of the initial layout plan displayed in step 9 in the flowchart of FIG. 3.

The graphic display controller 2 reads out the graphic data of the layout area from the graphic data memory 3 and displays it on the display unit 1. FIG. 5 shows an example of display. Graphic data for the layout area including the placement of 100A-LPCS-37 and 65A-LPCS-45 is generated in the manner described in the United States patent application Ser. No. 929,894, p. 21 line 1 through p. 22 line 9 (EPC patent application No. 86115709.5, p. 20 line 1 through p. 21 line 9).

The operator specifies a layout object in the picture displayed on the display unit 1 using the input unit 4. The name of the specified layout object is stored in the intermediate data memory 5e by way of the input port 5c: (step 10).

Figure 6:
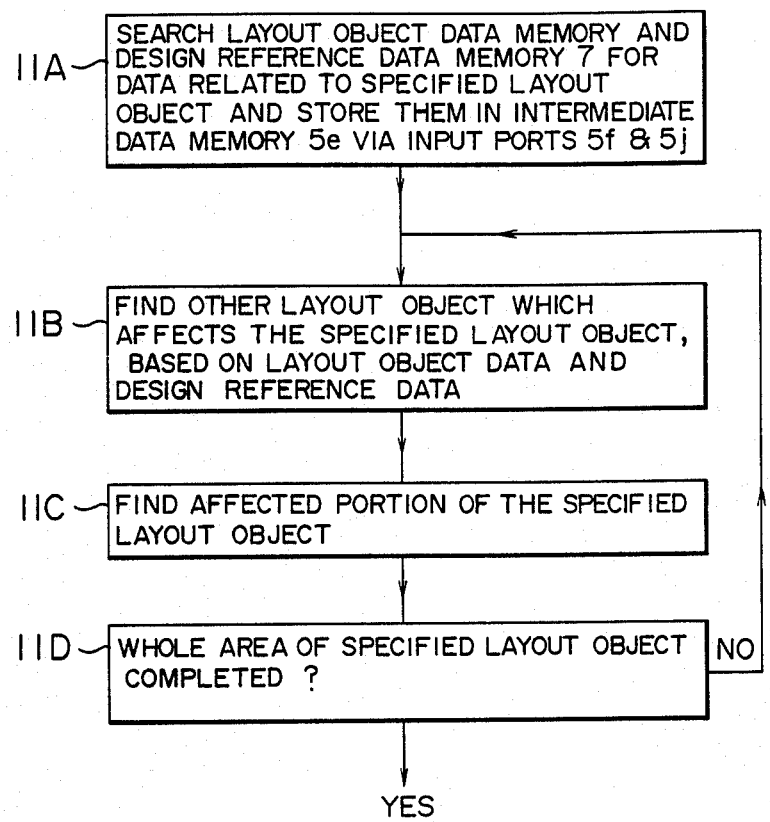
FIG. 6 is a flowchart showing in detail the operational step 11 in FIG. 3.
Figure 7:
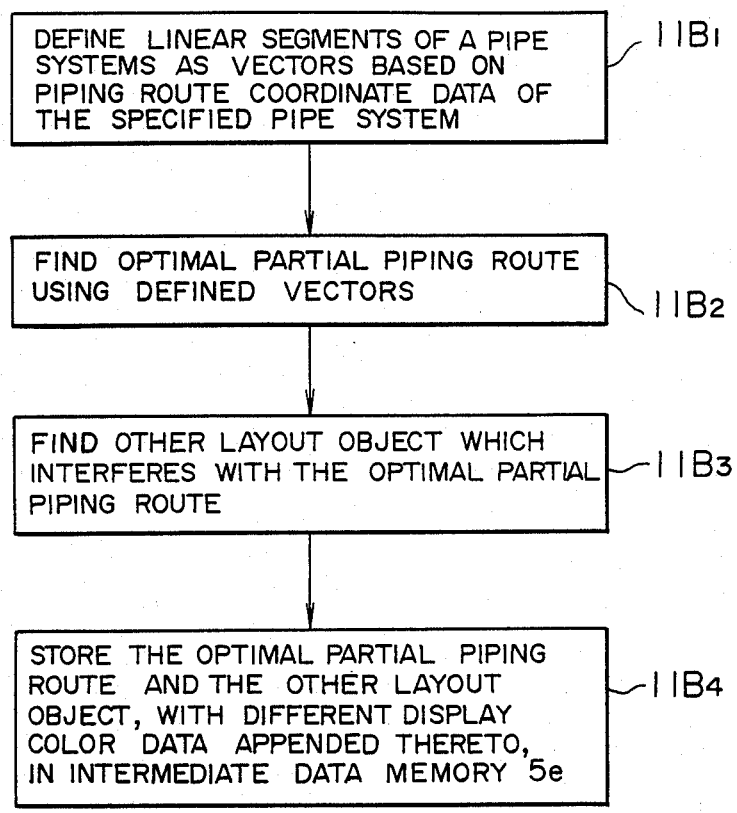
FIG. 7 is a flowchart showing in detail the operational step 11B in FIG. 3.

Next, a portion of the specified layout object under influence of another layout object and the other layout object itself are found: (step 11). Step 11 has a detailed process sequence shown as steps 11A–11D in FIG. 6. Step 11A searches the layout object data memory 6 for the layout object data pertinent to the specified layout object entered in step 10 and searches the design reference data memory 7 for design reference data pertinent to the specified layout object, and stores the retrieved data in the intermediate data memory 5e by way of the input port 5f and input port 5j, respectively. Based on the layout object data and design reference data provided in step 11A, an other layout object which affects the specified layout object is found: (step 11B). The other layout object is included in the graphic data in the layout area specified in step 9, and it is displayed together with the specified layout object on the display unit 1 upon completion of step 9. FIG. 7 shows a specific process sequence of step 11B for the case of designing a pipe system.

Figure 8:
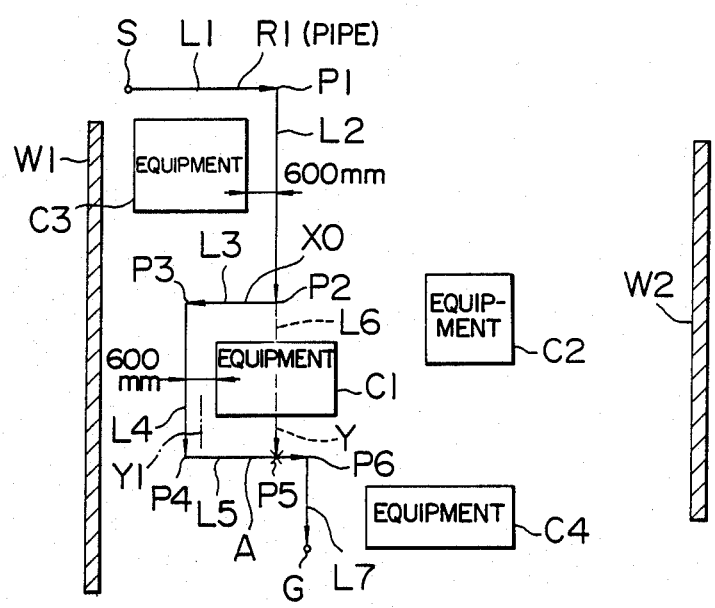
FIG. 8 is a diagram showing another example of display of the initial layout plan displayed in step 9 in the flowchart of FIG. 3.

FIG. 8 is a picture of the initial layout plan including the two layout objects shown in FIG. 3, i.e., pipe R1 and unit C1, displayed on the display unit 1 in step 9. The graphic data of the initial layout plan shown in FIG. 8 is generated in the same manner as for the graphic data shown in FIG. 5. In FIG. 8, symbols C2 through C4 denote other units and W1 and W2 denote walls. In the following discussion, it is assumed that the preceding step 10 has specified a pipe system R1 as a specified layout object. Step 11A retrieves layout object data of the pipe system R1 (data shown by FIG. 2A) and design reference data pertinent to the pipe R1 (i.e., "Spacing between a pipe and a unit shall be 600 mm at minimum"), and these data are stored in the intermediate memory 5e.

The processes which take place in accordance with steps 11B1–11B4 of FIG. 7 will be described by taking an example of the pipe system shown in FIG. 8. First, based on the specified layout object data stored in the intermediate data memory 5e, i.e., piping route coordinate data for the pipe system R1 shown by FIG. 2A, linear segments of the specified pipe system (L1 through L5 in FIG. 8) are defined as vectors sequentially from the start point: (step 11B1). The linear segments L1–L5 are then represented by vectors $L_1$–$L_5$ having magnitudes indicative of respective segment lengths. Next, based on the defined vectors, the optimal partial route (optimal layout route) for the specified pipe system is determined: (step 11B2). The determination of the optimal piping route takes place in the following processes (a) and (b) in the order from vector $L_5$ nearest to the end point G toward the start point S.

(a) For the vector A in attention to be $L_1$, a vector $X_0$ nearest to the vector A is selected out of vectors which meet $X = -\alpha L_1$ (where $\alpha$ is a constant) in the order of search from vector A toward the start point S. For example, when vector $L_5$ corresponding to linear segment L5 in the example of FIG. 8 is the vector A in attention, vector $L_3$ (linear segment L3) opposing in direction to vector $L_5$ is identified to be the vector $X_0$ nearest to vector A.

(b) If vector $X_0$ exists, a vector Y starting at the start point of vector $X_0$ (P2 in the example of FIG. 8) and ending on vector A, and standing perpendicularly to vectors A and $X_0$ is calculated. A line segment having the same direction and length as of vector Y is the optimal partial route for the specified pipe system. In the example of FIG. 8, vector Y connects start point P2 of vector $X_0$ and end point P5 on vector A, and accordingly linear segment L6 connecting the points P2 and P5 is found to be the optimal partial route.

Step 11B3 finds another layout object which interferes with the optimal partial route determined in step 11B2, in the following manner. Coordinates (x, y, z) of points located at a certain interval on the entirety of the optimal partial route are evaluated, and the layout object data memory 6 is searched for other layout object, i.e., piping or equipment other than the specified pipe system, having coordinates which interfere with the above evaluated coordinates. If any other layout object interfering with the optimal partial route exists, it is recognized to be a layout object which affects the layout of the specified layout object. In the example of FIG. 8, another layout object with its coordinates interfering with the coordinates of the optimal partial route L6, i.e., the unit C1 having a central position and dimensions shown by FIG. 2B, is retrieved in the layout object data memory 6. If any other layout object interfering with an optimal partial route of the specified pipe system is found, the subsequent step 11B4 implements the following process. Graphic data of the optimal partial route obtained in step B3 and the other layout object found in step B4 are stored in the intermediate data memory 5e as graphic data different in color code from the portion of layout object within the layout area specified in step 9, but other than those obtained in steps B3 and B4. Graphic data of the optimal partial route obtained in step B3 and that of the other layout object found in step B4 are different in color from each other.

If, on the other hand, other layout object interfering with the optimal partial route is absent (e.g., if the optimal partial route L6 is more left at position Y1 so that it does not interfere with the unit C1), step 11B3 further goes on searching in consideration of the design reference data which has been retrieved in step 11A. The layout object data memory 6 is searched for data pertinent to the central position and dimensions of the other layout object, and the arithmetic operator 5a produces positional data for various areas derived from other layout objects added by a restricted area prescribed in the design reference data. These areas are collated with the optimal partial route to find areas which interfere with the optimal partial route. In an interfering area, instead of other layout objects, the restricted area prescribed in the design reference data interferes with the optimal partial route. However, the restricted area may be attributable to other layout object, and in this case the other layout object can be said to virtually interfere with the optimal partial route. In the example of FIG. 8, design reference data "Spacing between a pipe and a unit shall be 600 mm at minimum" is retrieved. Consequently, the space of the unit C1 surrounded by a restricted area with a 600 mm width prescribed in the design reference data interferes with the optimal partial route L6. Even in the case of layout where the optimal partial route L6 is located more left so that the unit C1 does not interfere with it (location Y1 in FIG. 8), so far as the interference occurs in the restricted area for the unit C1, the optimal partial route L6 and the unit C1 are said to interfere with each other, and the unit C1 is categorized to be a layout object which affects the layout of the specified layout object (pipe system R1). Also in this case, the other layout object found in step 11B4 is memorized in the intermediate memory 5e.

Step 11C finds a portion of specified layout object under influence of the other layout object, basing on the layout object data retrieved in step 11A. In case the specified layout object is a pipe system, a partial piping route of the pipe system connecting the start point and end point of the vector Y (optimal partial route) obtained in step 11B2 is the portion of layout affected by other layout object which interferes with the optimal partial route. In the example of FIG. 8, a partial piping route P2-P3-P4-P5 connecting the start point P2 and end point P5 of the optimal partial route L6 is the portion affected by the unit C1. This partial piping route is also memorized in the intermediate data memory 5e.

Finally, a test is conducted for the whole space of the specified layout object as to whether portions under influence of the other layout object are detected completely: (step 11D). If the test result is negative, the steps 11B-11D are repeated until the search of the whole area complete. In the example of FIG. 8, the process goes on sequentially by replacing the vector A with vectors each having a start point at point P3, P2, P1 and S. In the loop of repetition, step B1 is removed. On the other hand, if step 11D provides a positive result, the process of step 11 completes.

FIG. 9 shows data of the other layout object affecting the layout and the affected portion of layout stored in the intermediate data memory 5e at the end of step 11.

Step 12 evaluates the value of loss, as an economical index, which is attributable to the layout of the specified layout object under influence of the other layout object. The value of loss stands for the increase in the installation area, pipe length or construction cost attributable to the layout of the specified layout object under influence of other layout objects. In the example of FIG. 8, the difference in length between the optimal partial route P2-P5 and the partial piping route P2-P3-P4-P5 laid out under influence of the unit C1, i.e., an increase in the length of the pipe system R1 caused by the unit C1, is the value of loss, and it is 3000 mm.

The value of loss as an economical index is, in other words, an increase in construction material (e.g., pipes, steel bars and concrete) used for the layout of one layout object under influence of other layout object. An increased amount of concrete is also used for the construction of a building associated with an increased installation area. The value of loss is stored in the intermediate memory 5e by in relation with the specified layout object.

Figure 10:
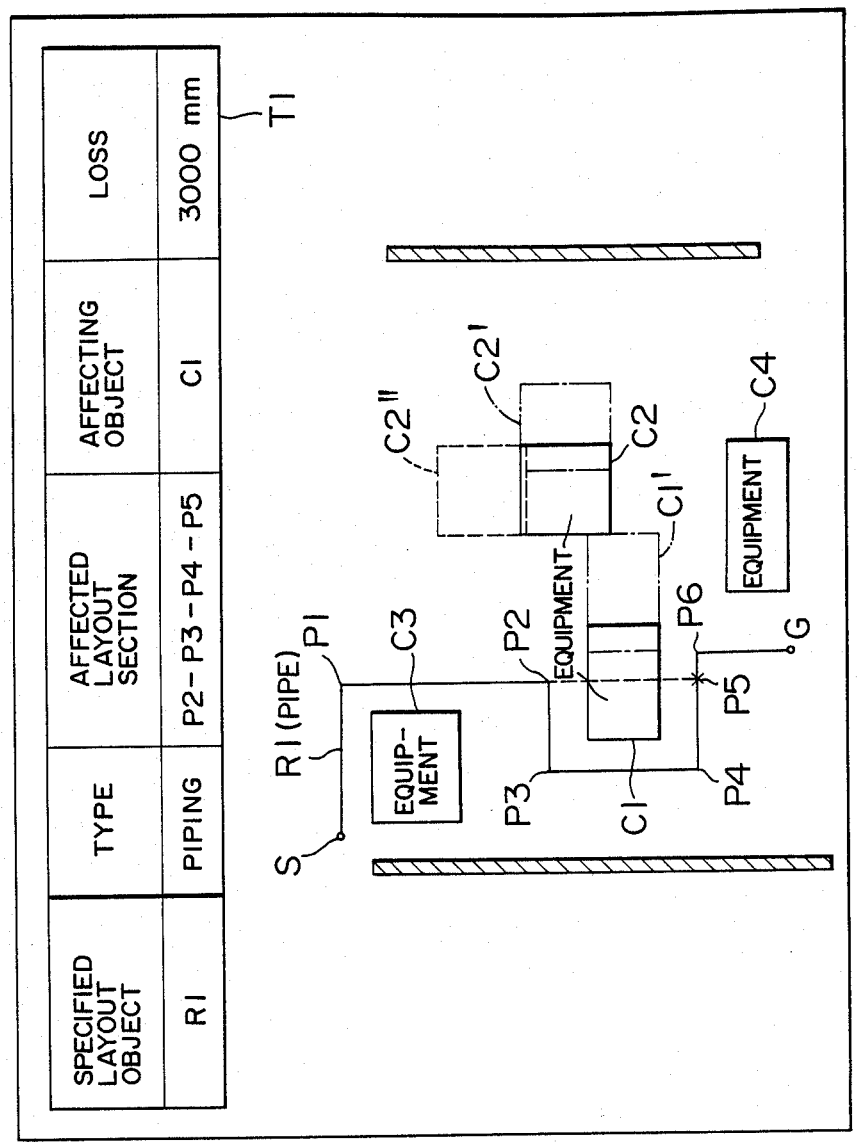
FIG. 10 is a diagram used to explain an example of display produced in step 13.

Subsequently, step 13 is carried out. The arithmetic operator 5a retrieves the other layout object which affects the layout of the specified layout object and the portion of specified layout object under influence of the other layout object both found in step 11, and the value of loss evaluated in step 12, and transfers these data to the graphic data memory 3. The graphic display controller 2 reads the graphic data out of the graphic data memory 3, and displays it on the display unit 1 as shown in FIG. 10. The display is for the pipe system C1 in FIG. 8, and a table T1 displayed is the result of process in step 13. The remaining portion of the display is the initial layout plan which has been displayed in step 9. In case there are more than one other layout object affecting the layout of a specified layout object and there are more than one portion of the specified layout object under influence of the other layout objects, all of these items are displayed together with the respective values of loss.

The operator views the display of FIG. 10 to recognize portions of layout objects which interfere with one another, i.e., portions to be modified before an economical layout is accomplished. These interfering layout object portions hamper economical layout. Since each interfering portion is given the value of loss, the operator can easily know the significance of layout modification in economical sense. The greater the value of loss, the greater economical effect is achieved by modification. Accordingly, layout modification will be carried out in the order from a portion with a large loss to a portion with a small loss.

Viewing the display produced in step 13 (e.g., display of FIG. 10), the operator enters a layout object appointed for modification and new coordinates of a modified portion of the layout object (modified layout plan) through the input unit 4. The arithmetic operator 5a receives the name of the layout object to be modified and new coordinates of the modification portion from the input unit 5c: (step 14).

Figure 11:
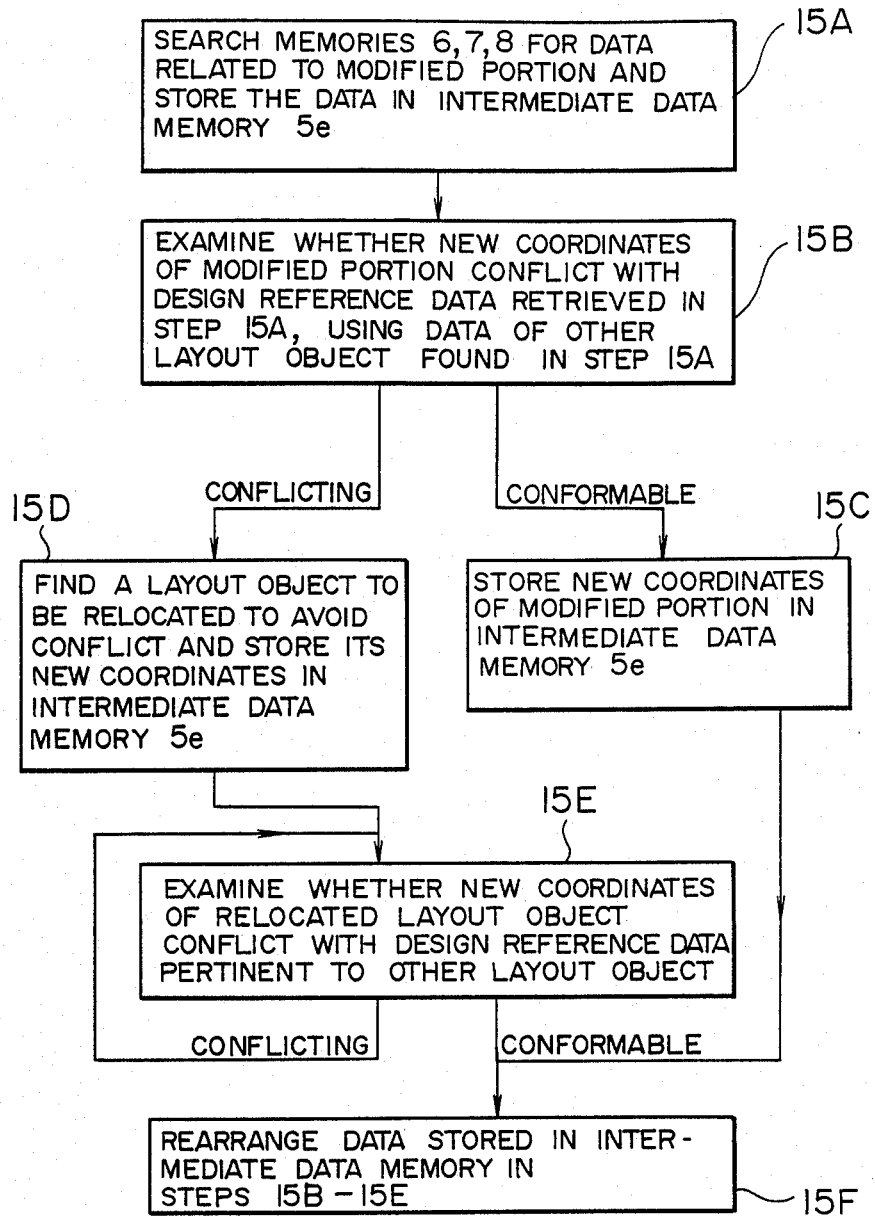
FIG. 11 is a flowchart showing in detail the operational sequence of step 15.

Step 15 examines the layout modification plan indicated by the input data entered in step 14. FIG. 11 shows detailed steps 15A-15F of the step 15. Step 15A searhes the layout object data memory 6, design reference data memory 7 and layout area graphic data memory 8 for data pertinent to the modification portion of the layout object under modification entered in step 14, i.e., coordinates of other layout object related to the modification portion, design reference data pertinent to the modification portion, and necessary graphic data, and transfers the retrieved data to the intermediate data memory 5e by way of the input ports 5f, 5j and 5h, respectively. The new coordinates of the modification portion entered in step 14 is examined using the coordinate data of the other layout object related to the modification portion and design reference data retrieved in step 15A to test whether the new coordinates of modification portion are conformable to the design reference data: (step 15B). If the modified coordinates are found conformable to the pertinent design reference data, the new coordinates of the modification portion of the layout object is stored as a modified layout plan in the intermediate data memory 5e: (step 15C). If, on the other hand, the coordinates of modification portion conflict with the pertinent design reference data, calculation is conducted for revealing the name of other layout object and its new coordinates involved for the avoidance of the conflict, and the calculated new coordinates are stored in the intermediate data memory 5e:

(step 15D). In the example of FIG. 10, the new coordinates of the modification portion of the layout object (pipe R1) entered in step 14, i.e., the optimal partial route connecting P2 and P5, interfere with other layout object (unit C1), and therefore this modification plan is determined to be conflicting with the design reference data in step 15B. The pertinent design reference data in this case is "Spacing between a pipe and a unit shall be 600 mm at minimum". The minimal movement of the other layout object (unit C1) for satisfying the design reference data results in new coordinates shown by the dash-dot line C1' in FIG. 10 (calculated in step 15D). In moving the other layout object, if more than one new candidate location exists, step 15D reveals coordinates of all candidates and stores them in the intermediate data memory 5e.

Next, a procedure similar to steps 15A–15D takes place for testing the conformity of the new coordinates of the other layout object (first other layout object) in need of relocation found in step 15D to a layout object (second other layout object, e.g., unit C2) other than the modification layout object (e.g., pipe system R1) nor the first other layout object (e.g., unit C1) and the pertinent design reference data: (step 15E). In step 15E, "modification portion of modification layout object" is prescribed to be "modification other layout object" by the function of steps 15A–15D.

In step 15E, relocation of other layout object spreads successively to separate layout objects until the other layout object to be relocated has its new coordinates found conformable to the design reference data pertinent to it, or other layout object to be relocated cannot move (e.g., abutment on a wall). In the example of FIG. 10, the unit C1 has its new coordinates interfering with the neighboring unit C2 and conflicting with the design reference data "Spacing between units shall be 1000 mm at minimum" applied to the spatial relationship with unit C2. Therefore, step 15E calculates new coordinates of the layout object (unit C2) which needs to be relocated for the avoidance of conflict. If the movement of the unit C2 is found infeasible due to design reference data in relation with other item, or if the new coordinates go out of the specified layout booth, relocation of the unit C2 is rendered impossible. In this event, the unit name C2 and a flag indicative of infeasible relocation are stored in the intermediate data memory 5e. On the other hand, if it is found that the new coordinates of the unit C2 is conformable to the design reference data and the unit can be relocated, the unit name C2 and a flag indicative of feasible relocation are stored in the intermediate data memory 5e. The new coordinates of the unit C2 (shown by the dash-dot block C2' and dashed block C2" in FIG. 10) have been stored in the intermediate data memory 5e when they have been revealed in the same manner as step 15D, and therefore they need not be stored this time. FIGS. 12(A)–12(C) show an example of data form for the results of steps 15D and 15E for the layout objects shown in FIG. 10 stored in the intermediate data memory 5e.

Figures 13, 16:
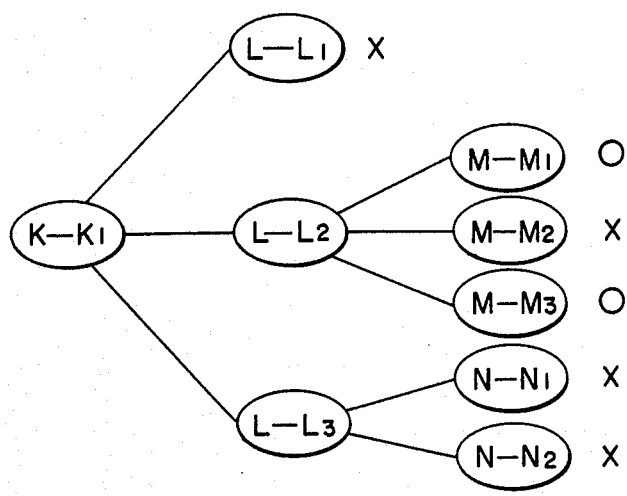
FIG. 13 is a diagram explaining the spreading of layout modification caused by a layout object.
FIG. 16 is a diagram showing an example of the evaluation table.

The following describes the spreading of process encountered in relocating layout objects in steps 15B, 15C, 15D and 15E with reference to FIG. 13 dealing with layout objects K, L, M and N, apart from the example of FIG. 10. In the diagram of FIG. 13 illustrating the spreading of layout modification, each node stands for a movement of each layout object, and associated branches stand for possible movements of a further layout object attributable to the first-mentioned object movement. Marks "o" and "x" attached to the most downstream nodes signify the test results of feasibility of relocation for the layout objects represented by the nodes. In this case, data to be stored include the object name and new coordinates (start point and bend points of each pipe, or central position of each unit) entered through the input unit 4 for layout objects specified through the input unit 4, and, for a layout object to be relocated, its object name and the name of other layout object causing the relocation of the first-mentioned layout object and new coordinates. A relocation layout object which has undergone the final test is added by a flag of test result ("0" for feasible relocation, or "1" for infeasible relocation). In the example of FIG. 13, relocation of layout object K to a new location K1 affects the layout of L, which in turn is relocated to a new location L2, and this relocation affects the layout of object M, which in turn is relocated to a new location M1 or M2, all successfully, and in conclusion the layout modification of the object K to the location K1 is accomplished.

Step 15F at the end of step 15 rearranges, for each layout plan, data stored in the intermediate data memory 5e in the preceding steps 15B–15E, and stores the rearranged data back to the intermediate data memory 5e. FIG. 14 shows an example of data rearranged for each layout plan by step 15F. The data for each layout plan includes a layout plan classification number, relocation layout object name and new coordinates for a modification-feasible layout plan, or a layout plan classification number, non-relocatable layout object name, relocation layout object name and new coordinates for a modification-infeasible layout plan.

The detailed process sequence of step 15F for producing the data of FIG. 14 from the data of FIGS. 12(A)–12(C) is as follows.

(i) The intermediate data memory 5e is searched for data having a flag indicative of feasible or infeasible layout modification ("0" or "1") among the data shown in FIGS. 12(A)–12(C).

(ii) Using, as an index, the name of layout object which has caused relocation among data having the above flag, the intermediate data memory 5e is searched for data having the index as the layout object name.

(iii) Step (ii) is repeated until the layout object name consistent with the index is found.

(iv) A classification number indicating a layout plan is appended to data listed in the above search operation.

(v) The data form is converted in accordance with the flag of the data searched in step (i).

Step 15F is followed by step 16, in which graphic data of modification-feasible layout plans (first plan, second plan, and so on) examined in step 15 is found basing on the data rearranged in step 15F and data of modification layout object (excluding the rearranged data) stored in the layout object data memory 6. Then, the graphic data is stored in the intermediate data memory 5e.

Step 17 calculates the value of loss for each modification-feasible layout plan examined in step 15. This operation is the calculation of loss after modification for all modification layout objects carried out in the same manner as steps 11 and 12. In case the loss is evaluated as a length of route, the value of loss may be calculated on the basis of the difference between the total length of the initial layout plan and the total length of the modified layout plan. The resulting data of loss are stored in relation with the layout plans in the intermediate data memory 5e. When the layout modification of the layout object specified for relocation in step 14 has been executed, the combination of a decreased value of loss of the specified layout object and increased values of loss of other layout objects attributable to this layout modification may result in an increased value of loss as the whole.

Figure 15:
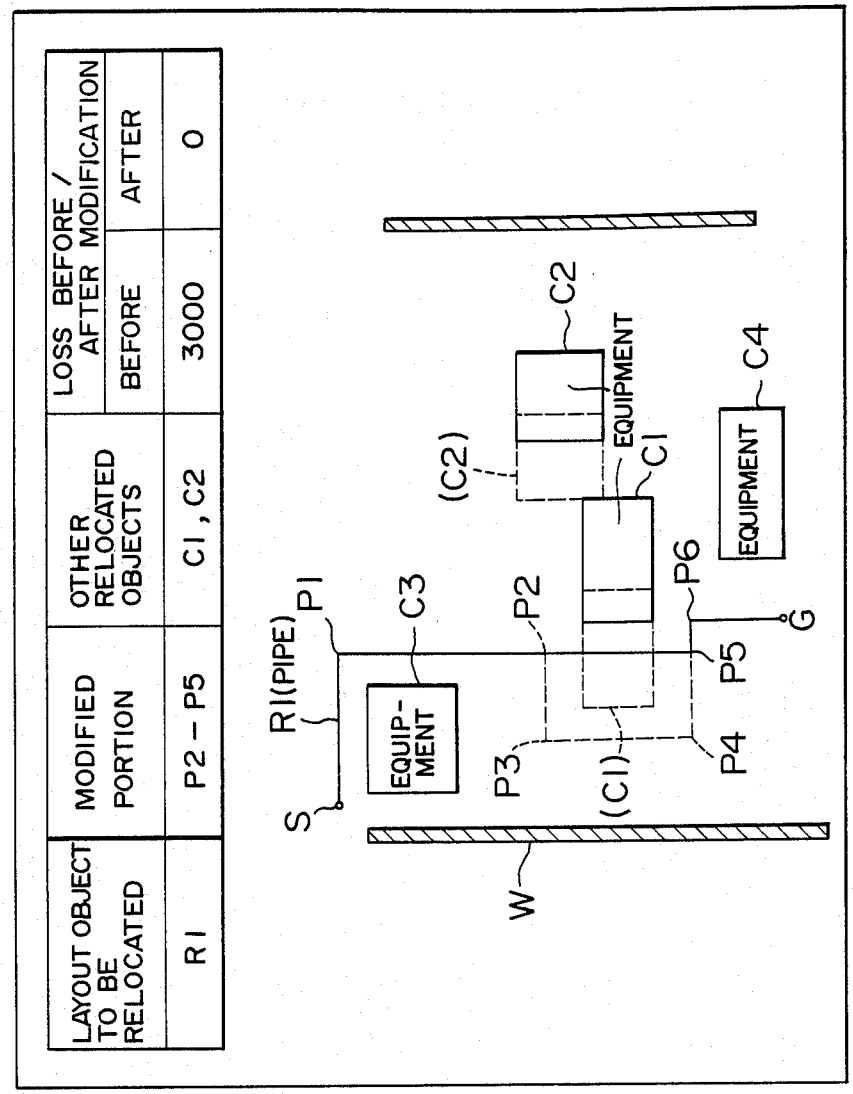
FIG. 15 is a diagram showing an example of display on the display unit produced in step 17 in FIG. 3.

Finally, the process of step 18 is carried out for delivering the test result obtained in step 15 and the graphic data and loss data for the modification-feasible layout plan obtained in steps 16 and 17 to the graphic data memory 3 by way of the graphic data output port 5d. The graphic display unit 2 fetches the graphic data from the graphic data memory 3 which has been written in step 17, and displays it on the display unit 1. FIG. 15 shows an example of display, in which a modified route P2-P5 of the pipe system R1 is dictated for the initial layout plan. In this example, modification is feasible, and for this the units C1 and C2 need to be relocated. The layout modification has improved the economy by reducing the loss. In this example, layout plans before and after the modification are displayed in a distinctive manner on the same screen. Two kinds of display on the same screen can be distinguished using flags of symbols or characters attached to lines or using different type, thickness or color of lines. In the example of FIG. 15, the layout plan before the modification is displayed using dashed lines, and locations of units before the modification are indicated by their unit names enclosed in parentheses. Although the display of FIG. 15 includes only one layout modification plan, if there are several modification plans, they may be displayed simultaneously using the multi-window technique on the display unit 1.

Another conceivable display mode is that only evaluation tables of layout plans are displayed so that the operator can choose one of the tables, and the selected layout plan is displayed in the form as shown in FIG. 15. FIG. 16 shows an example of the evaluation table. The table lists, for all modified layout plans, the name of layout objects which need to be relocated, the change in the total length of route due to modification (in the case of piping), and the change in the amount of hardware such as steel bars necessary for the layout modification.

As described above, the layout design assisting system of this embodiment has the ability of relocating the piping route and equipment, which examines the feasibility of relocation of all other layout objects attributable to the layout modification for an item within the layout area. Consequently, a modified portion of layout in carrying out economical layout can be examined for the feasibility in consideration of the spreading of relocation to all other layout objects affected by the modified layout portion, before the new layout plan is put into practice. The system compares the economical loss before and after the layout modification for the modified portion, and the operator can know the degree of economical improvement achieved by the layout modification.

The foregoing embodiment is useful for carrying out the economical layout design efficiently. Specifically, the system reveals layout portions to be modified in an initial layout plan for achieving economical layout design, and reveals a portion to be modified which yields the most significant economical effect. The system reveals the feasibility of relocation for all other layout objects that are affected by a partial alternation within the layout area. In addition, the system reveals the economical effect for the whole layout area attributable to a layout modification.

In the process sequence of FIG. 3, the steps 12 and 13 for evaluating and displaying the value of loss may be skipped at the sacrifice of information on the order of significance (economical effect) among modification plans.

Next, other embodiments of this invention will be described.

Figure 17:
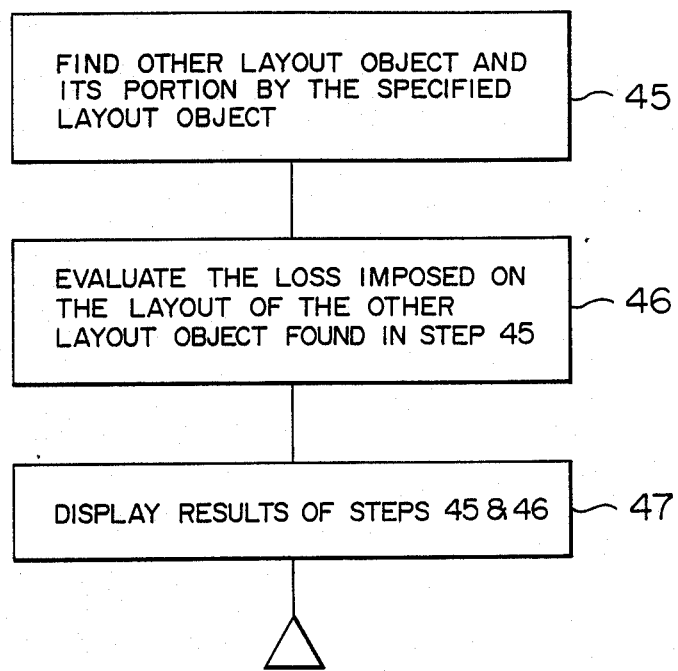
FIG. 17 is a flowchart showing another embodiment of steps 11, 12 and 13 in FIG. 3.

One of other embodiments is the replacement of steps 11-13 in the process sequence of FIG. 3 with steps 45-47 shown in FIG. 17. The following describes only the replaced portion of the sequence. Step 10 in FIG. 3 is followed by step 45. Step 45 is to find other layout object which is affected in layout by the specified layout object and the portion of the other layout object under influence of the specified object. Step 46 is to calculate the value of loss created for the other layout object found in step 45. Step 47 is to display the other layout object affected by the specified layout object, the affected portion of the other layout object and the value of loss.

Figure 18:
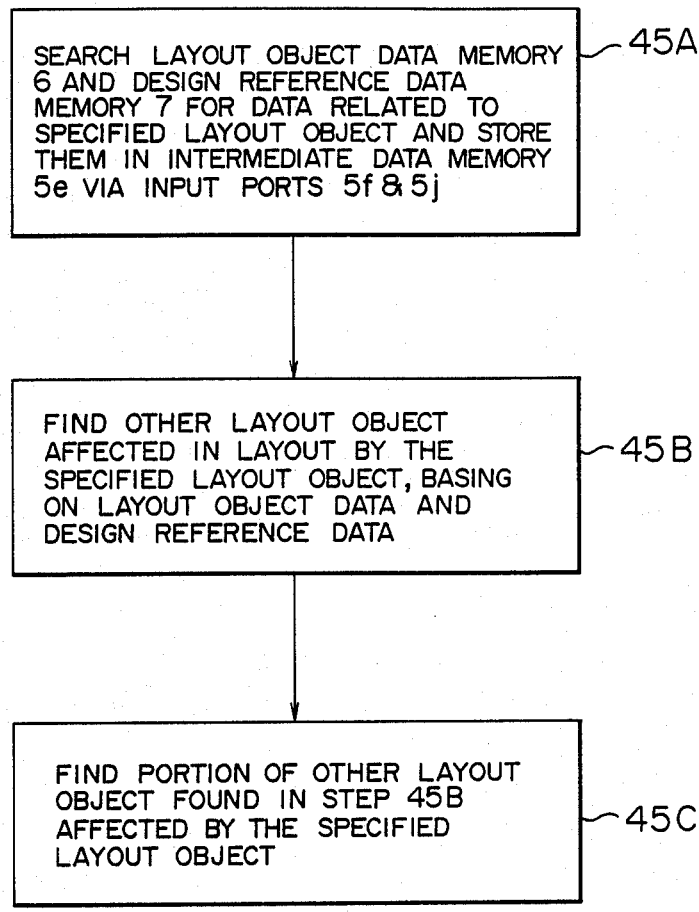
FIG. 18 is a flowchart showing in detail the operational sequence of step 45 in FIG. 17.

FIG. 18 shows the detailed process sequence implemented in step 45.

Step 45A searches the layout object data memory 6 and design reference data memory 7 for data related to the specified layout object entered in step 10, and stores the retrieved data in the intermediate data memory 5e by way of the input ports 5f and 5j. Step 45B finds other layout object which is affected in layout by the specified layout object, using the data retrieved in step 45A. In case the other layout object is a pipe system, the details of the step 45B are identical to the aforementioned steps 11B1-11B4. Step 45C resembles the step 11C, and it finds the portion of other layout object under influence of the specified layout object, as detected in step 45, and stores the affected layout portion in the intermediate memory 5e.

Step 46 is similar to step 12, and it evaluates the value of loss attributable to the layout of the other layout object under influence of the specified layout object, as detected in step 45. In case the other layout object is a pipe system, the differential length between the partial piping route and optimal piping route stands for the loss. The evaluated loss is stored in relation with the specified layout object in the intermediate memory 5e. Step 47 is similar to step 13, and it delivers the graphic data obtained in steps 45 and 46 to the graphic data memory 3. These data are displayed on the display unit 1. This embodiment achieves the same effectiveness as of the preceding embodiment.

Figure 19:
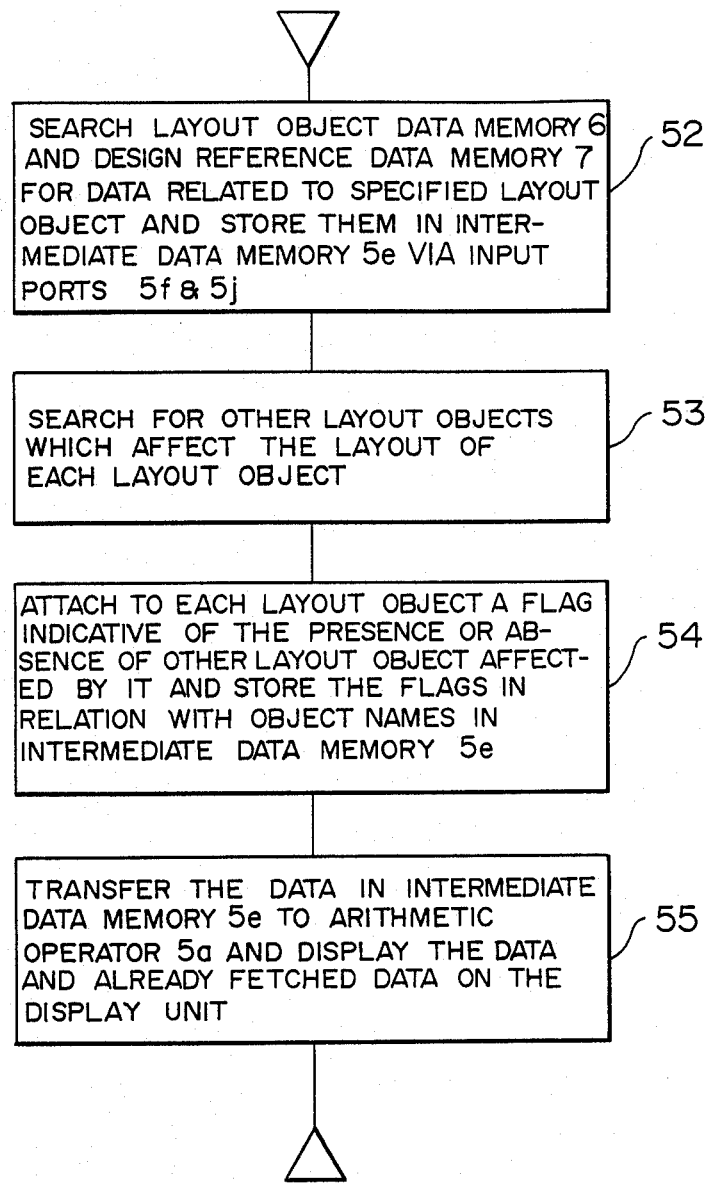
FIG. 19 is a flowchart showing another embodiment of steps 9 through 13 in FIG. 3.

Although steps 9-13 in FIG. 3 are to search, for display, other layout objects that affect the layout of a specified layout object, these steps may be altered to steps 52-55 shown in FIG. 19 as a modified embodiment of this invention. Step 52 searches the layout object data memory 6 and design reference data memory 7 for the layout object data and design reference data pertinent to the layout object specified through the input unit 4, and stores the retrieved data in the intermediate data memory 5e by way of the input ports 5f and 5j. Step 53 implements the process similar to steps 11B1-11B4 to search for other layout objects which affect the layout of each layout object. Step 54 attaches each layout object a flag indicative of whether or not other layout object affecting its layout exists, and stores the flags in relation with the corresponding layout objects in the intermediate memory 5e. Step 55 sends the data obtained in steps 53 and 54 to the graphic data memory 3 by way of the graphic data output port 5d. The graphic display controller 2 reads the data out of the graphic data memory 3 and displays it on the display unit 1. The display form is designed so that a layout object affected in layout by other layout objects is distinguishable against unaffected layout objects, and for this purpose the arithmetic operator 5a produces distinctive graphic data using the flag defined in step 54. For example, a system employing a color display unit deals with a color code of different values for these displayed items.

In the process sequence of FIG. 3, step 10 enters only a layout object through the input unit 4. However, it is possible for this step to specify the level of layout modification and the range of layout modification using the input unit 4. The layout modification level stands for the threshold of allowing on disallowing the movement determined for each type of layout objects. For example, units can be moved, while the piping route cannot be moved, in many cases. The layout modification range stands for the threshold of allowing or disallowing the movement in dependence on the coordinates in the layout area. In case step 10 has entered a value of the above-mentioned level in addition to a specified layout object, the type and coordinates of each layout object entered to the arithmetic operator 5a in step 9 are referenced to define a movement discrimination flag for each object, and the flags are stored in the intermediate memory 5e for use in step 15E. Step 15E tests the feasibility of movement of layout objects which must be relocated basing on the flag defined above. Entry of the layout modification level and range enables presetting of operator's decision as input data.

It is possible for the present invention to enter the object name and new location by pointing a layout object displayed on the screen using a joy-stick or mouse device. A produced picture can be displayed not only in the 3-dimensional mode, but also in the 2-dimensional drawing mode.

The present invention is of course applicable also to the assistance of layout modification other than the plant layout design.

FIG. 20 shows a further embodiment of this invention. The reason for the interactive operation for the layout modification is that the decision as to which layout objects should be relocated in what sequence and by what amount of movement is dependent on the knowledge of the operator. The arrangement of FIG. 20 is intended to automate this decision process. The system is additionally provided with a knowledge base memory 56 for storing the operator's knowledge, and a process sequence for making decision equivalently to the operator's decision through the inference using the knowledge base memory 56 is stored in the memory of the arithmetic processor 5. Shown by 5m and 5l are an input port and output port for the knowledge base a memory. Information displayed on the screen in the embodiment of FIG. 2 is transformed so that it is understandable for the arithmetic processor 5, and basing on the information the arithemtic processor 5 makes decision equivalently to the operator's ability by use of the stored knowledge, whereby layout modification can be performed automatically.

According to the present invention, an initial layout plan for the plant equipment installation and piping is examined to find layout objects which hamper economical layout, so that the layout plan can readily be modified to attain the economical goal.

We claim:
1. A design assisting method comprising the steps of:
retrieving selectively data of a layout object specified through an input unit from a first memory;
retrieving selectively design reference data pertinent to said specified layout object from a second memory;
finding another layout object which interferes with said specified layout object based on retrieved layout object data and design reference data;
evaluating an economical loss imposed on one of said specified layout object and said other layout object attributable to an interference with the other of said specified layout object and said other layout object; and
displaying said specified layout object, said other layout object and said economical loss on a display unit.

2. A design assisting method according to claim 1, wherein said step of finding another layout object comprises the steps of:
finding an optimal pipe route for a pipe system, wherein said pipe system is said specified layout object, based on layout object data of said pipe system; and
finding said other layout object which interferes with said optimal pipe route.

3. A design assisting method according to claim 2, wherein said step of evaluating an economical loss comprises the steps of:
finding a pipe route of said pipe system affected by layout of said other layout object; and
evaluating as said economical loss a difference between an amount of construction material needed for said pipe route and an amount of construction material needed for said optimal pipe route.

4. A design assisting method comprising the steps of:
retrieving selectively data of a layout object specified through an input unit from a first memory;
retrieving selectively design reference data pertinent to said specified layout object from a second memory;
finding another layout object which interferes with said specified layout object based on retrieved layout object data and design reference data;
testing feasibility of relocating one of said specified layout object and said other layout object interfering with each other; and
displaying said specified layout object, said other layout object and a test result on a display unit.

5. A design assistance method according to claim 4, wherein said step of finding another layout object comprises the steps of:
finding an optimal pipe route for a pipe system, said pipe system being said specified layout object; and
finding said other layout object interfering with said optimal pipe route.

6. A design assisting apparatus comprising:
an input unit for specifying a layout object;
a first memory for storing layout object data;
a second memory for storing design reference data;
a third memory for storing a process sequence wherein said process sequence retrieves selectively data of a layout object, specified by said input unit, from said first memory, retrieves design reference data pertinent to said specified layout object from said second memory, finds another layout object which interferes with said specified layout object based on retrieved layout object data and design reference data, retrieves selectively data of said other layout object from said first memory and evaluates an economical loss imposed on one of said specified layout object and said other layout object attributable to an interference with the other of said specified layout object and said other layout object based on the retrieved layout object and design reference data;

processing means for finding said other layout object and evaluating said loss in accordance with said process sequence; and a display unit for displaying said specified layout object, said other layout object and said economical loss.

7. A design assisting apparatus comprising:

an input unit for specifying a layout object and a modified layout location of a layout object;

a first memory for storing layout object data;

a second memory for storing design reference data;

a third memory for storing a process sequence wherein said process sequence retrieves selectively data of a layout object specified by said input unit from said first memory, retrieves selectively design reference data pertinent to said specified layout object from said second memory, finds another layout object which interferes with said specified layout object based on the retrieved layout object data and design reference data, retrieves selectively data of said other layout object from said first memory and tests feasibility of relocating one of said specified layout object and said other layout object to said modified layout location based on said modified layout location, retrieved layout object data and design reference data;

processing means for testing feasibility of relocation of a layout object in accordance with said process sequence; and a display unit for displaying said specified layout object, said other layout object and a result of said test.

8. A design assisting apparatus comprising:

means for retrieving selectively data of a layout object specified through an input unit from a first memory;

means for retrieving selectively design reference data pertinent to said specified layout object from a second memory;

means for finding another layout object which interferes with said specified layout object based on the retrieved layout object data and design reference data;

means for evaluating an economical loss imposed on one of said specified layout object and said other layout object attributable to an interference with the other of said specified layout object and said other layout object; and means for displaying said specified layout object, said other layout object and said economical loss on a display unit.

9. A design assisting apparatus comprising:

means for retrieving selectively data of a layout object specified through an input unit from a first memory;

means for retrieving selectively design reference data pertinent to said specified layout object from a second memory;

means for finding another layout object which interferes with said specified layout object based on retrieved layout object data and design reference data;

means for testing feasibility of relocating one of said specified layout object and said other layout object interfering with each other; and means for displaying said specified layout object, said other layout object and a test result on a display unit.

10. A design assisting apparatus comprising:

an input unit for specifying a layout object;

a first memory storing layout object data;

a second memory storing design reference data;

process means for retrieving selectively data of a layout object specified by said input unit from said first memory, retrieving design reference data pertinent to said specified layout object from said second memory, finding another layout object which interferes with said specified layout object based on the retrieved layout object data and design reference data retrieving selectively data of said other layout object from said first memory, and evaluating an economical loss imposed on one of said specified layout object and said other layout object attributable to another based on the retrieved layout object data and design reference data; and a display unit for displaying said specified layout object, said other layout object and said economical loss.

11. A design assisting apparatus comprising:

an input unit for specifying a layout object and a modified layout location of a layout object;

a first memory for storing layout object data;

a second memory for storing design reference data;

a process means for retrieving selectively data of a layout object specified by said input unit from said first memory, retrieving selectively design reference data pertinent to said specified layout object from said second memory, finding another layout object which interferes with said specified layout object based on retrieved layout object data and design reference data, retrieving selectively data of said other layout object from said first memory, and testing feasibility of relocating one of said specified layout object and said other layout object to said modified layout location based on said modified layout location, the retrieved layout object, and design reference data;

means for evaluating an economical loss imposed on one of said specified layout object and said other layout object attributable to an interference with the other of said specified layout object and said other layout object; and a display unit for displaying said specified layout object, said other layout object and a result of said test.

* * * * *